(12) United States Patent
Troton

(10) Patent No.: US 7,309,090 B2
(45) Date of Patent: Dec. 18, 2007

(54) BODYWORK ELEMENT MADE OF PLASTICS HAVING A GRILLE INTEGRALLY MOLDED WITH SAID BODYWORK ELEMENT

(75) Inventor: Jean Troton, Munich (DE)

(73) Assignee: Compagnie Plastic Omnium, Lyons (FR)

( * ) Notice: Subject to any disclaimer, the term of this patent is extended or adjusted under 35 U.S.C. 154(b) by 216 days.

(21) Appl. No.: 11/182,326

(22) Filed: Jul. 15, 2005

(65) Prior Publication Data

US 2006/0055208 A1    Mar. 16, 2006

(30) Foreign Application Priority Data

Jul. 16, 2004   (FR) .................................. 04 07950

(51) Int. Cl.
*B60J 9/00*   (2006.01)
(52) U.S. Cl. .................................................. 296/1.08
(58) Field of Classification Search ............... 296/1.08, 296/1.07, 29, 187.01, 193.01, 193.09, 193.1, 296/193.03, 193.04
See application file for complete search history.

(56) References Cited

U.S. PATENT DOCUMENTS

| | | | | |
|---|---|---|---|---|
| 4,406,489 A | * | 9/1983 | Trabert | 293/115 |
| 4,917,203 A | * | 4/1990 | Sacco et al. | 180/68.6 |
| 5,549,352 A | * | 8/1996 | Janotik et al. | 296/209 |
| 6,921,117 B2 | * | 7/2005 | Rackham et al. | 293/115 |
| 7,044,517 B2 | * | 5/2006 | Hyuga | 296/193.1 |
| 7,073,849 B1 | * | 7/2006 | Nunes | 296/193.1 |
| 7,152,915 B2 | * | 12/2006 | Diehl et al. | 296/193.1 |
| 7,182,398 B2 | * | 2/2007 | Lin | 296/193.1 |
| 2004/0124670 A1 | * | 7/2004 | Tate | 296/193.1 |
| 2005/0006928 A1 | * | 1/2005 | Diehl et al. | 296/193.1 |
| 2005/0023863 A1 | * | 2/2005 | Stull | 296/193.1 |
| 2006/0237995 A1 | * | 10/2006 | Huttenlocher | 296/193.1 |

FOREIGN PATENT DOCUMENTS

FR    2821817 A3    9/2002

* cited by examiner

*Primary Examiner*—H Gutman
(74) *Attorney, Agent, or Firm*—Robert L. Epstein; Epstein Drangel Bazerman & James

(57) ABSTRACT

A bodywork element comprising a skin and an original grille integrally molded with the element. The original grille can be replaced by a replacement grille that takes its place in the skin.

8 Claims, 5 Drawing Sheets

BODYWORK ELEMENT MADE OF PLASTICS HAVING A GRILLE INTEGRALLY MOLDED WITH SAID BODYWORK ELEMENT

The invention relates to a bodywork element made of plastics material, such as a bumper shield, and including a grille molded integrally with the element.

BACKGROUND OF THE INVENTION

Such an element is already known, presenting the advantage of the grille which is already present on the skin not needing to be molded separately and then mounted on the skin, thereby saving two operations and consequently reducing cost price.

However, a drawback of such an element is that the entire element needs to be replaced in the event of the grille becoming damaged, and that is expensive.

Bodywork elements with replaceable grilles are also known, such an element being of the type comprising a skin provided with a grille-receiving opening and snap-fastening tabs for a grille that is received in the opening and that is made separately. In the event of the grille being damaged, a replacement grille can easily be inserted to take the place of the damaged grille, once the damaged grille has itself been removed.

Unlike a bodywork element made integrally with a grille, that element suffers from the drawback that the initial grille needs to be molded separately and then mounted on the skin, leading to the above-mentioned extra cost.

OBJECTS AND SUMMARY OF THE INVENTION

The present invention seeks to provide a technique that combines the advantages of both of the two above-described techniques.

The present invention provides a bodywork element made of plastics material comprising a skin and an original grille integrally molded with a portion of the element and united therewith via bridges of material.

This element includes fastener means for fastening a replacement grille, which fastener means are likewise integrally molded with a portion of the element.

The invention makes it possible to benefit both from the advantage of molding the element integrally with a first grille and also from the advantage of said grille being replaceable by another grille in the event of being damaged, the other grille being fitted to the element after the damaged grille has been taken away, the bridges of material being broken or cut, and the other grille being secured by the fastener means present on the element.

The invention also presents the advantage that for a vehicle presenting different versions in which the grilles need to present different appearances, the element can be made with an original grille in the most common of its versions, and for some of the versions of the vehicle the original grille can be replaced by a specific grille that is molded separately.

In a particular embodiment of the invention, the element is a bumper shield.

In another embodiment, the element is constituted by an assembly comprising a bumper shield and a strength member that are designed to be fastened to each other. Under such circumstances, the skin constitutes a portion of the element that includes the fastener means for a replacement grille and the strength member constitutes another portion of the element that includes the bridges of material with the original grille.

In this embodiment, the skin can be arranged to hide the bridges of material between the strength member and the original grille, such that after said bridges have been cut, there remains no visible trace of the original grille that is visible from outside the vehicle.

In a further-improved embodiment, the original grille molded together with the strength member includes skin-positioning means. This improved embodiment procures the significant advantage that the skin can thus be put directly into position relative to the grille, thereby ensuring that an opening formed through the skin coincides accurately with the grille secured to the strength member.

The positioning means thus act indirectly to position the skin relative to the strength member.

The skin-positioning means present on the original grille preferably couple with the replacement grille fastener means present on the skin.

In a particular embodiment, the element further includes second fastener means for fastening a replacement grille, suitable for taking the place of the first fastener means, should they be damaged.

BRIEF DESCRIPTION OF THE DRAWINGS

In order to enable the invention to be better understood, there follows a description of an embodiment given by way of an example that does not limit the scope of the invention, and that is described with reference to the accompanying drawings, in which.

MORE DETAILED DESCRIPTION

Figure 1:
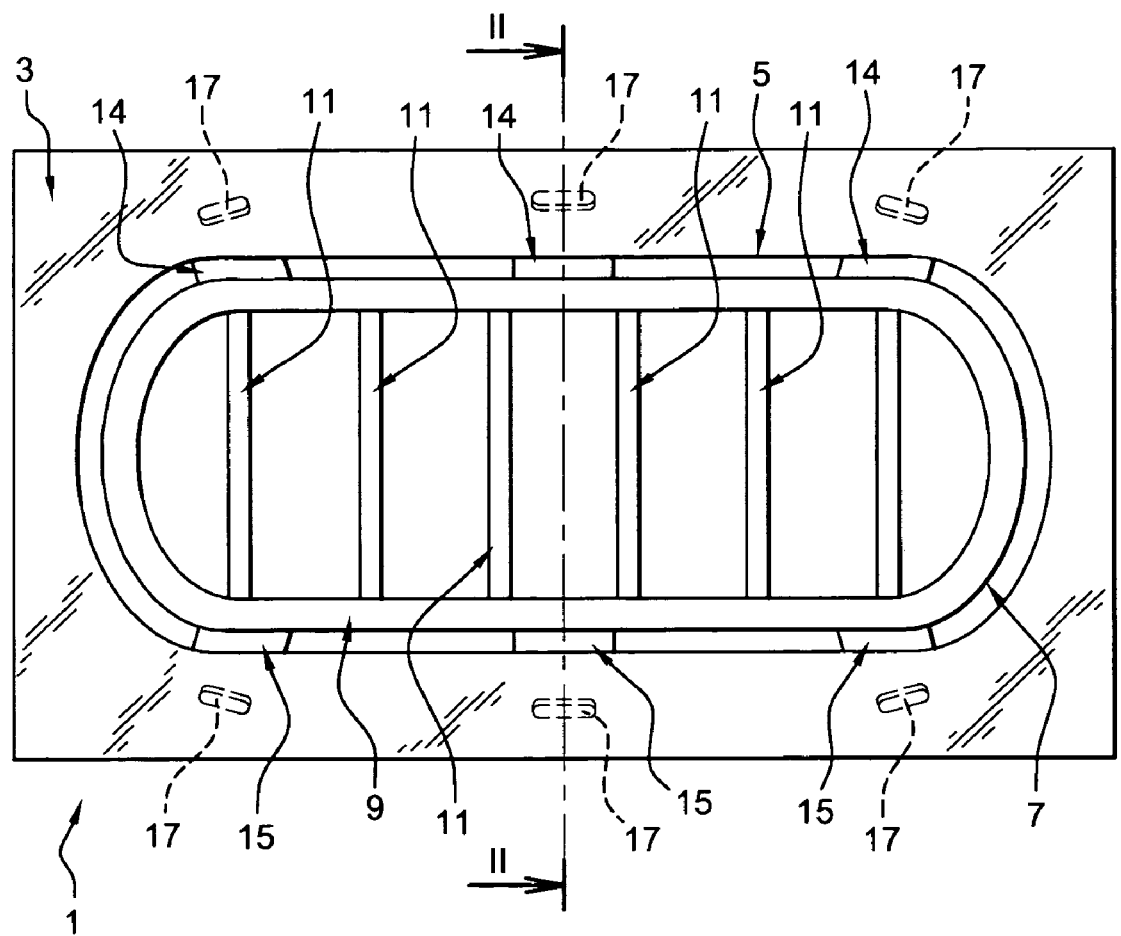
FIG. 1 is a face view of a bumper shield in a first embodiment of the invention.

In the first embodiment as shown in FIGS. 1 to 4, a bumper shield 1 is constituted by a plastics material skin 3, e.g. made of polypropylene. The shield is preferably made by injection molding.

Substantially in its central portion, the skin 3 has an oblong opening 5 which is occupied by an original grille 7, itself constituted by an oblong frame 9 and bars 11 that are vertical (in the orientation of the drawing).

The frame 9 of the grille 7 is connected to the skin 3 by top and bottom bridges of material 14 and 15 that are in the form of tongues, and in the example shown in the drawings there are a total of six tongues.

The entire shield 1 is obtained by a single molding operation, producing the skin 3, the grille 7, and the bridges of material 14 and 15.

Figure 2:
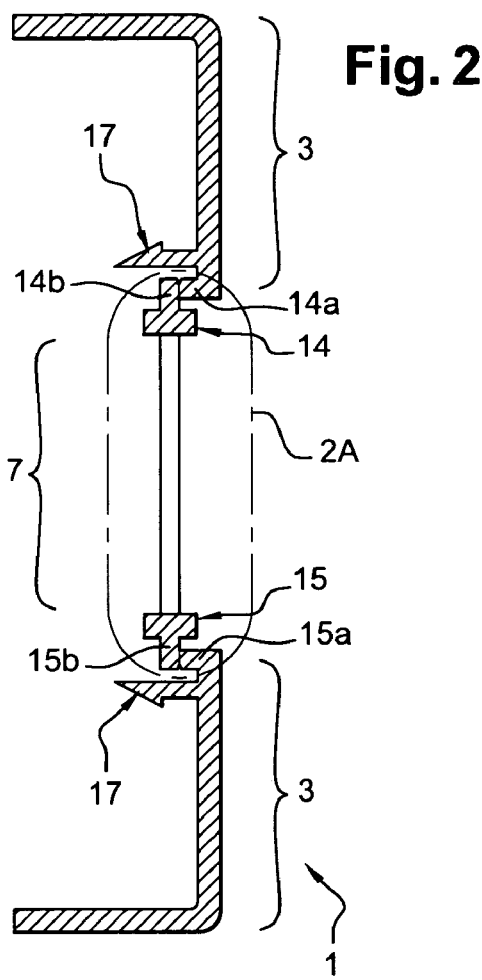
FIG. 2 is a section on II-II of FIG. 1.

As can be seen in FIG. 2, the grille 7 is set back a little from the front face of the skin 3, with the bridges of material 14 and 15 being L-shaped, each having a branch 14a or 15a that is substantially horizontal (in the orientation of the drawings) and a branch 14b or 15b that is substantially vertical (again in the orientation of the drawings).

Above each top bridge of material 14 and below each bottom bridge of material 15, the skin 3 includes a snap-fastening tongue 17 projecting from its inside face, and likewise molded together with said skin.

Thus, six snap-fastening tongues 17 are situated around the grille 7, being disposed radially further away therefrom than are the bridges of material 14 and 15.

Figure 3:
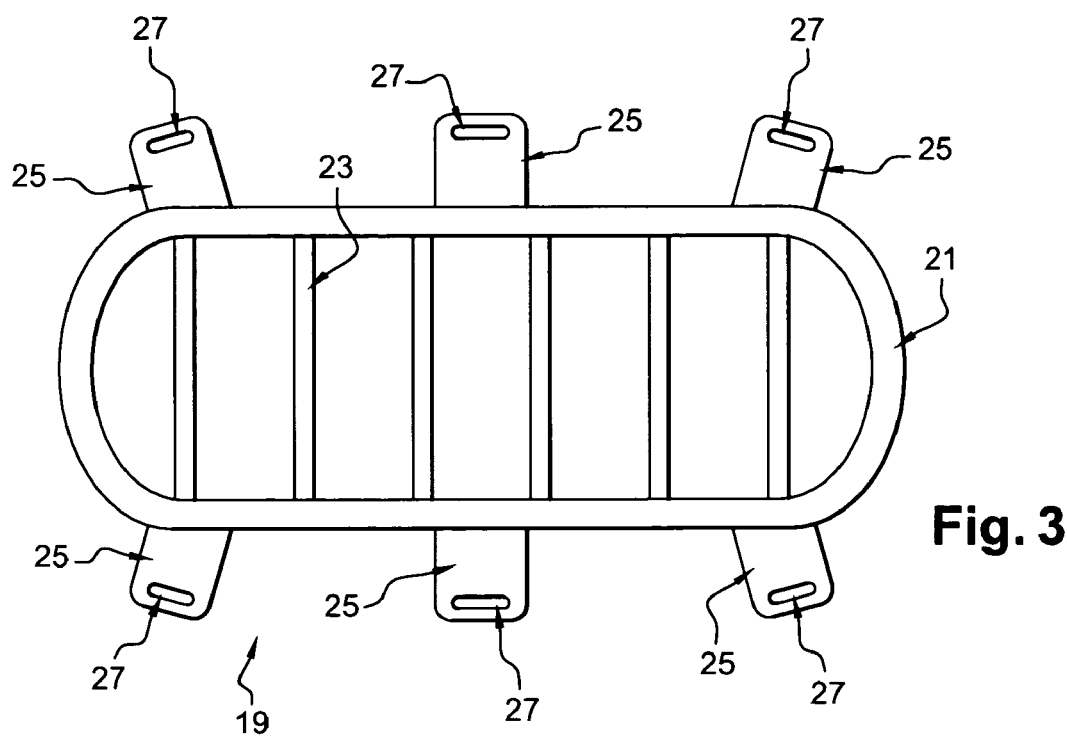
FIG. 3 is a face view of a replacement grille designed for the shield of FIG. 1.

These snap-fastening tongues 17 constitute fastener means for fastening a replacement grille 19, as described below with reference to FIG. 3.

Like the above-described original grille 7, the replacement grille 19 comprises a plastics material frame 21 and bars 23 that are vertical (in the orientation of the drawings), the frame 21 being of substantially the same shape as the frame 9 of the original grille 7.

In the example shown, the bars 23 are identical in the original grille 7 and the replacement grille 19, but bars of some other configuration would not go beyond the ambit of the invention, particularly when replacing the original grille 7 with a more up-market grille.

Figure 4:
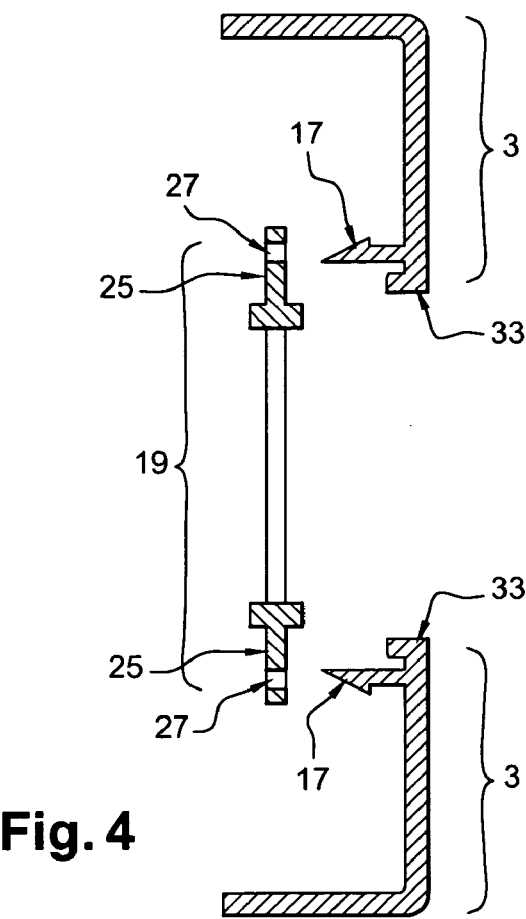
FIG. 4 is a view analogous to FIG. 2 showing the original grille being replaced.

The replacement grille 19 also has six fastener lugs 25 each having a slot 27 formed therein of dimensions suitable for fastening a snap-fastening tongue 17 of the skin. The six tongues 25 of the replacement grille 19 are positioned in such a manner that their slots 27 coincide with the six snap-fastening tongues 17 of the skin 3 when the replacement grille 19 is presented to the inside face of the skin 3, as shown in FIG. 4.

There follows a description of how the original grille 17 molded integrally with the skin 3 can be replaced by the replacement grille 19.

Figure 2A:
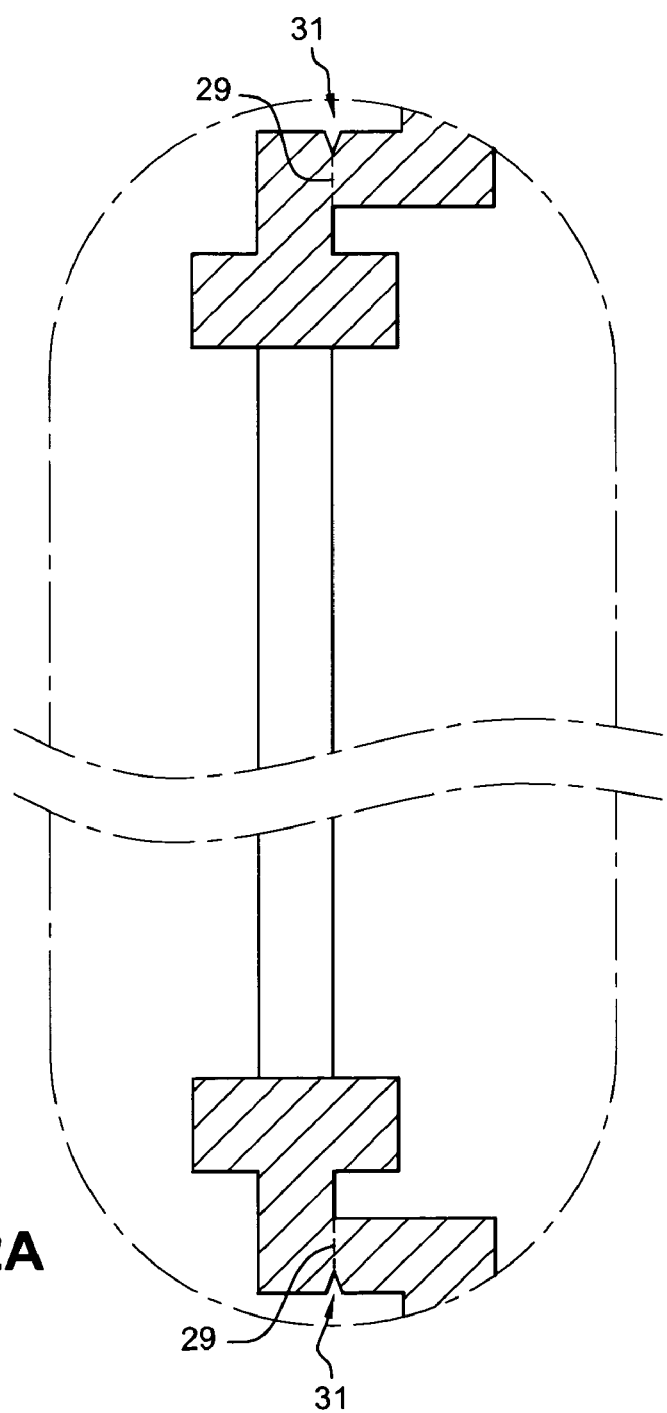
"FIG. 2A is a view on a larger scale of a region 2 A in FIG. 2;"

Using appropriate tooling, the bridges of material 14 and 15 are cut or broken along the dashed lines 29 shown in FIG. 2A.

For this purpose, the bridges of material 14 and 15 may include respective breakable zones of weakness obtained by section narrowing 31 making them easier to break or cut in the appropriate location.

Once the grille 7 has been separated from the skin 3, portions 33 of the bridges of material remain on the skin 3, as can be seen in FIG. 4.

The replacement grille 19 can then be presented to the inside face of the skin 3 in such a manner that the slots 27 in the fastener lugs 25 are in register with the snap-fastener tongues 17 of the skin 3.

It then suffices to press the replacement grille 19 against the inside face of the skin 3 so that the fastener lugs 25 come to bear against the portions 33 on the bridges of material with the snap-fastening tongues 17 penetrating through the slots 27 and, once they have passed through the entire thickness of the slots 27, holding the replacement grille 19 against the skin 3.

The replacement grille 19 is then in exactly the same position as was the original grille 7, and its interface with the skin 3 is entirely similar to the previous interface of the original grille 7 because the breakable zones 31 of the bridges of material 14 and 15 cannot be seen from outside the shield 1.

It can be seen that the skin 3 as described above combines the advantage of being provided with an original grille 7, thus avoiding any need to make the grille 7 separately and then mounted, and the advantage of enabling the grille 7 to be replaced where necessary, without replacing the remainder of the shield.

Figure 5:
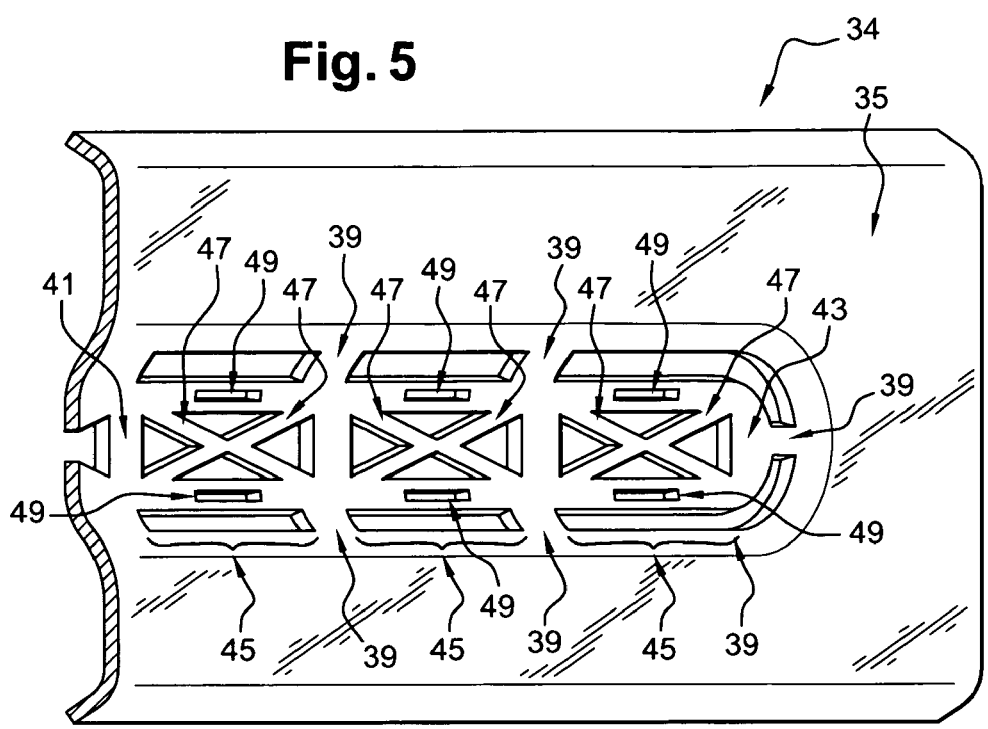
FIG. 5 is a section and perspective view of a bumper shield strength member in a second embodiment of the invention.
Figure 6:
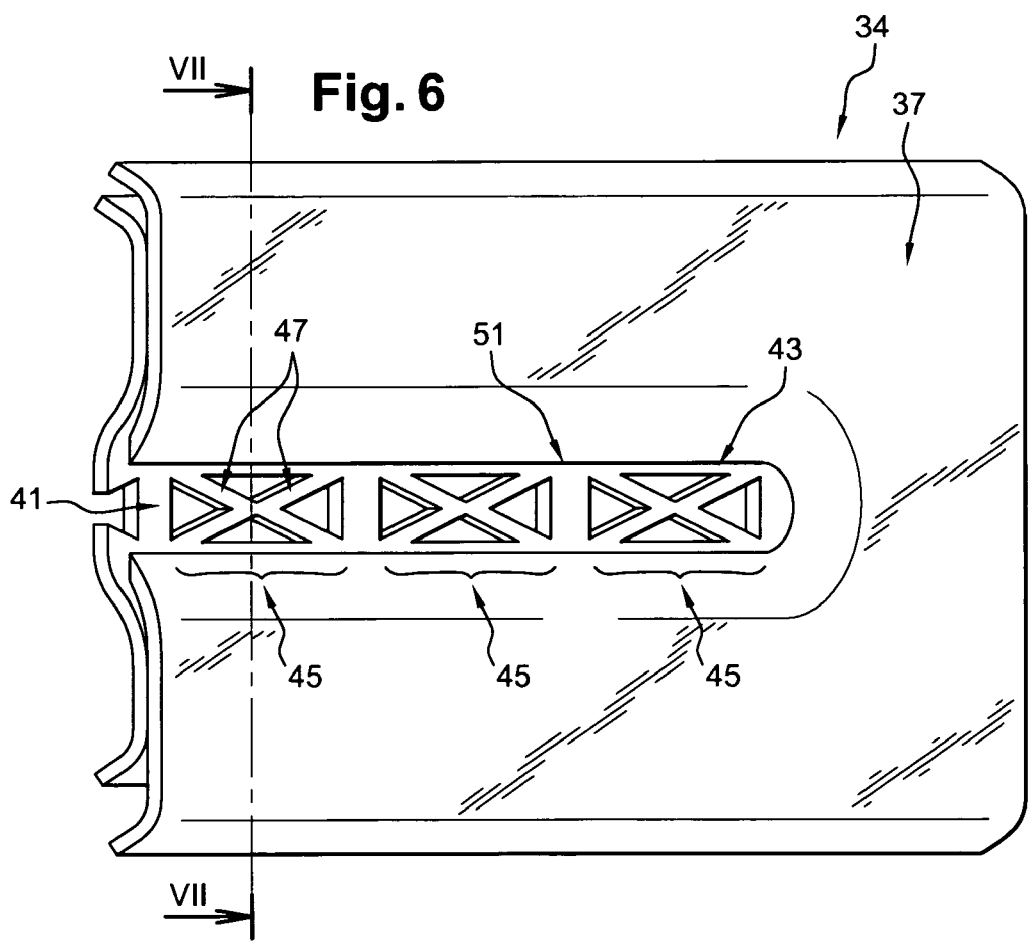
FIG. 6 is a view analogous to FIG. 5 showing the strength member covered by a skin.

In the embodiment of FIGS. 5 to 9, the bumper shield 34 is made up of two parts, namely a strength member 35 shown in FIG. 5 and a skin 37 shown in FIG. 6.

Figure 9:
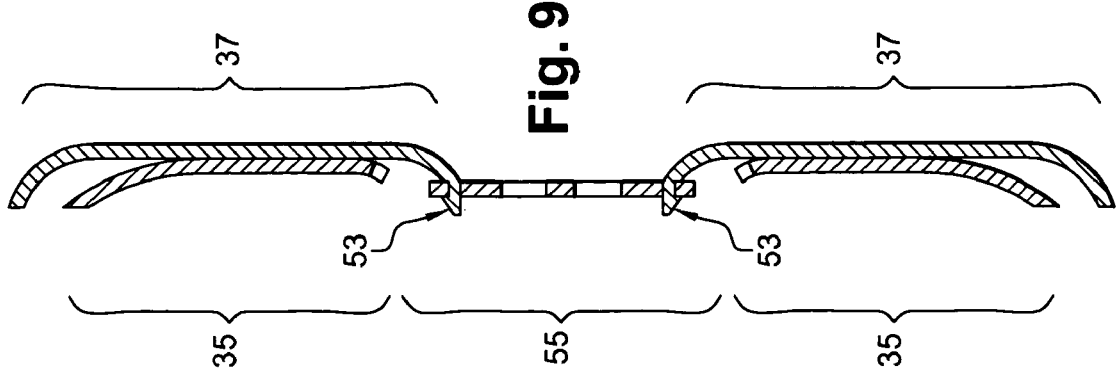
FIG. 9 is a view analogous to FIG. 7 showing the shield fitted with a replacement grille.
Figure 8:
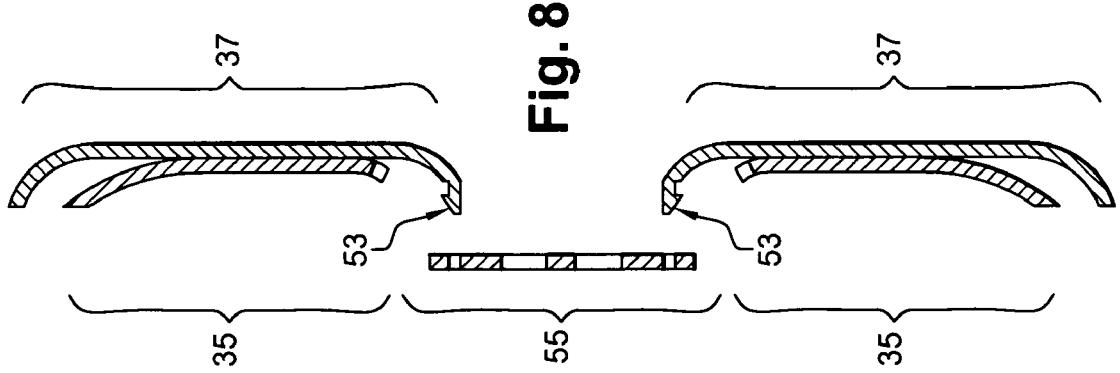
FIG. 8 is a view analogous to FIG. 7, showing the original grille being replaced.
Figure 7:
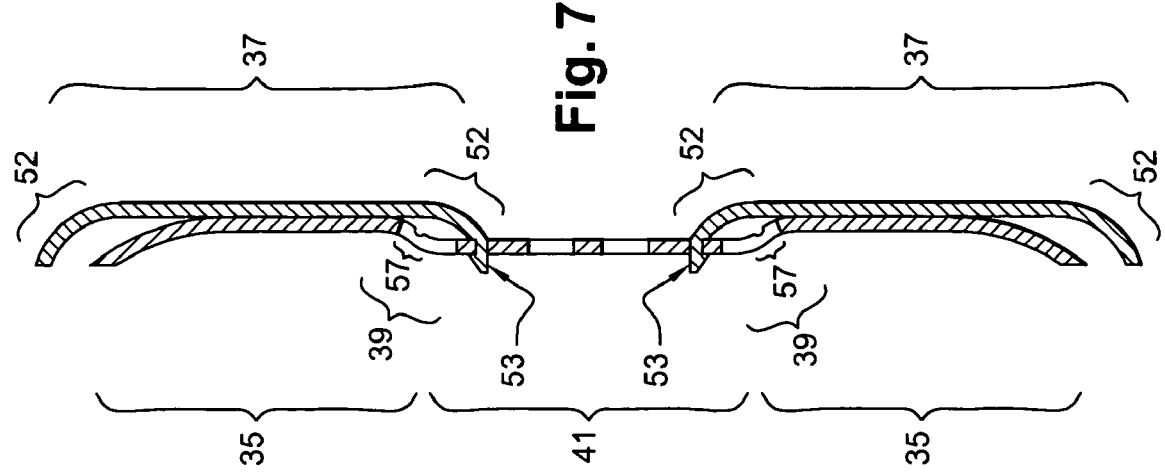
FIG. 7 is a section on VII-VII of FIG. 6.

As can be seen in FIGS. 7 to 9, the strength member 35 serves in particular to support the skin 37 in the plane regions thereof. Other functions not shown herein may also be performed by the strength member 35, such as supporting components or defining positioning relative to an adjacent bodywork element.

As can be seen in FIG. 5, the strength member 35 constitutes the portion of the shield 34 that includes the bridges of material 39 linking with an original grille 41, made integrally with the strength member 35 while it is being injection molding.

In the example described, the grille 41 comprises a frame 43 around rectangular cells 45, each closed by a cross of two sloping bars 47.

The grille 21 is set back from the front face of the strength member 35.

Slots 49 are formed in the frame 43 of the grille 41 above and below each cell 47. The function of these slots 49 is described in association with the skin 37 that is shown in particular in FIG. 6.

This skin 37 has a central opening 51 of dimensions that are a little smaller than the dimensions of the frame 43 of the grille 41, such that when the skin 37 overlies the strength member 35, as shown in FIG. 6, the edges 52 of the opening in the skin covers the frame 43 and hids the slots 49 so that only the bars 47 and the cells 45 can be seen.

Starting from these edges 52 pointing towards the inside of the skin, the snap-fastening tongues 53 are disposed in such a manner as to coincide with the slots 49 of the grille when the skin 37 is properly positioned relative to the grille 41.

As can be seen in FIG. 7, when the skin 37 overlies the strength member 35, the snap-fastening tongues 53 couple with the slots 49 in the frame 43 of the grille 41 so that the edge 52 of the opening in the skin 37 is snap-fastened to the grille 41.

Thus, in the original grille 41, integrally molded with the strength member 35, the slots 49 act as means for positioning the skin 37, which skin is thus directly positioned relative to the grille 41.

Once this positioning has been achieved, the strength member 35 can be held in position and secured by separate means.

In this embodiment, a replacement grille 55 is constituted by a grille identical to that described with reference to FIG. 5, with the exception that the bars may present a different configuration.

Because the shapes of the original grille 41 and of the replacement grille 55 are identical, the replacement grille 55 can come from molding some other strength member and cutting the bridges of material at the base of the frame of the grille.

In other words, in this embodiment, there is no need to provide a separate injection mold for making the replacement grille 55. In particular, the replacement grille 55 can come from reject strength member 35 moldings, in which the grille 41 is of good quality but the remainder of the strength member 35 is not.

With reference to FIGS. 8 and 9, there follows a description of how the original grille 41 can be replaced by a replacement grille 55.

The bridges of material 39 are initially cut or broken preferably in the vicinity of their breakable zones of weakness 57 as can be seen in FIG. 7.

Once the original grille 41 has been separated from the strength member 35, it suffices to undo the snap-fastening with the skin 37 and substitute a replacement grille 55 which is in turn snap-fastened to the skin 35, as can be seen in FIGS. 8 and 9.

The snap-fastening tongues 53 of the skin thus act as fastener means for the replacement grille.

Once replacement has been performed, and as can be seen in FIG. 9, the broken bridges of material 39 still cannot be seen from outside the shield 34. However, the skin 37, which was previously positioned relative to the original grille 41 and fastened in position by means that are not shown, retains the position that was imparted thereto by the original grille 41, thereby guaranteeing that the replacement grille 55 is properly positioned.

This embodiment is particularly advantageous in that the original grille 41 belongs to an element, namely a strength member 35, that performs a large number of functions. In particular, the strength member 35 may form part of an adjacent bodywork element that needs to be accurately positioned relative to the skin 37 that is to cover the strength member 35.

The embodiments described above are not limiting in any way. The person skilled in the art can modify them as a function of requirement without thereby going beyond the ambit of the invention.

What is claimed is:

1. A bodywork element made of plastics material comprising a skin and an original grille integrally molded with a portion of the element and united therewith via bridges of material, the element including fastener means for fastening a replacement grille, which fastener means are likewise integrally molded with a portion of the element.

2. An element according to claim 1, constituting a bumper shield.

3. An element according to claim 2, constituted by an assembly of a bumper skin and a strength member that are designed to be fastened to each other, the skin including a portion of the element that includes said fastener means for fastening a replacement grille, and the strength member constituting another portion of the element that includes the bridges of material connecting with the original grille.

4. An element according to claim 3, in which the skin is arranged to hide the bridges of material between the strength member and the original grille.

5. An element according to claim 3, in which the original grille integrally molded with the strength member includes means for positioning the skin.

6. An element according to claim 4, in which the skin-positioning means present on the original grille couple with said fastener means for fastening a replacement grille and present on the skin.

7. An assembly comprising a bodywork element and a replacement grille, wherein the bodywork element is an element according to claim 1.

8. A bodywork element made of plastic material comprising a skin and an original grille integrally molded with a portion of the element and united therewith via bridges of material, the element including first fastener means for fastening a replacement grille, said first fastener means for fastening a replacement grille being likewise integrally molded with a portion of the element, and second fastener means for fastening a replacement grille, to take the place of said first fastener means for fastening a grille in the event that said first fastener means for fastening a replacement grille is damaged.

* * * * *